(12) United States Patent
Kikuchi et al.

(10) Patent No.: US 12,236,508 B2
(45) Date of Patent: Feb. 25, 2025

(54) TERMINAL APPARATUS, OPERATING METHOD OF TERMINAL APPARATUS, AND NON-TRANSITORY COMPUTER READABLE MEDIUM

(71) Applicant: TOYOTA JIDOSHA KABUSHIKI KAISHA, Toyota (JP)

(72) Inventors: Daisuke Kikuchi, Yokohama (JP); Wataru Kaku, Musashino (JP); Aiko Sawado, Tokyo-to (JP); Mina Funazukuri, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/192,114

(22) Filed: Mar. 29, 2023

(65) Prior Publication Data

US 2023/0316612 A1    Oct. 5, 2023

(30) Foreign Application Priority Data

Mar. 29, 2022    (JP) .................. 2022-054397

(51) Int. Cl.
*G06T 11/60*        (2006.01)
*G06F 3/01*         (2006.01)
*G06T 3/60*         (2024.01)
*G06T 11/20*        (2006.01)
*G06T 13/40*        (2011.01)
*G06T 13/80*        (2011.01)

(52) U.S. Cl.
CPC .............. *G06T 11/60* (2013.01); *G06F 3/011* (2013.01); *G06T 3/60* (2013.01); *G06T 11/20* (2013.01); *G06T 13/40* (2013.01); *G06T 13/80* (2013.01); *G06T 2200/24* (2013.01)

(58) Field of Classification Search
CPC . G06T 11/60; G06T 3/60; G06T 11/20; G06T 13/40; G06T 13/80; G06T 2200/24; G06F 3/011; G06F 3/04815; G06F 3/04845; G06N 20/00
See application file for complete search history.

(56) References Cited

U.S. PATENT DOCUMENTS

| | | | | |
|---|---|---|---|---|
| 6,809,843 | B1* | 10/2004 | Youngers | H04N 1/3247 |
| | | | | 382/233 |
| 6,999,061 | B2* | 2/2006 | Hara | G06F 3/04883 |
| | | | | 345/157 |
| 7,929,002 | B2* | 4/2011 | Shelton | G06F 3/0346 |
| | | | | 715/718 |
| 10,635,372 | B2* | 4/2020 | Min | G06F 9/30 |
| 2003/0007683 | A1* | 1/2003 | Wang | G06V 30/413 |
| | | | | 382/159 |
| 2008/0024443 | A1* | 1/2008 | Horikiri | G06F 3/0386 |
| | | | | 345/157 |

(Continued)

FOREIGN PATENT DOCUMENTS

| | | | |
|---|---|---|---|
| JP | 2004-355494 A | 12/2004 | |
| JP | 2005-191964 A | 7/2005 | |

(Continued)

*Primary Examiner* — Grant Sitta
(74) *Attorney, Agent, or Firm* — Oliff PLC (57) ABSTRACT

A terminal apparatus includes a controller. The controller is configured to flip text included in an illustration drawn by a first user on a virtual screen in virtual space to be legible as seen from a virtual camera.

19 Claims, 6 Drawing Sheets

(56) References Cited

U.S. PATENT DOCUMENTS

| | | | | |
|---|---|---|---|---|
| 2013/0083072 | A1* | 4/2013 | Yoshino | G06F 3/017 |
| | | | | 345/649 |
| 2015/0116198 | A1* | 4/2015 | McCoy | G06F 3/011 |
| | | | | 345/156 |
| 2015/0199089 | A1* | 7/2015 | Lee | G06F 3/0482 |
| | | | | 715/716 |
| 2015/0235346 | A1* | 8/2015 | Kim | G06F 3/00 |
| | | | | 345/649 |
| 2016/0205353 | A1* | 7/2016 | Wilson | G06F 3/005 |
| | | | | 348/14.08 |
| 2019/0026132 | A1 | 1/2019 | King et al. | |
| 2021/0058611 | A1* | 2/2021 | Redmann | G06F 3/04815 |

FOREIGN PATENT DOCUMENTS

| | | |
|---|---|---|
| JP | 2015-230684 A | 12/2015 |
| JP | 2016-515325 A | 5/2016 |
| JP | 2020-038468 A | 3/2020 |
| JP | 2021-064399 A | 4/2021 |
| WO | 2014/130378 A1 | 8/2014 |

* cited by examiner

TERMINAL APPARATUS, OPERATING METHOD OF TERMINAL APPARATUS, AND NON-TRANSITORY COMPUTER READABLE MEDIUM

CROSS-REFERENCE TO RELATED APPLICATION

This application claims priority to Japanese Patent Application No. 2022-054397 filed on Mar. 29, 2022, the entire contents of which are incorporated herein by reference.

TECHNICAL FIELD

The present disclosure relates to a terminal apparatus, an operating method of a terminal apparatus, and a program.

BACKGROUND

Technology for communication between multiple users using virtual space is known. For example, Patent Literature (PTL) 1 describes defining virtual space that includes a first avatar associated with a first user and a second avatar associated with a second user.

CITATION LIST

Patent Literature

PTL 1: JP 2021-64399 A

SUMMARY

In the field of play, creative activity, or the like, uses may sometimes wish to share illustrations or the like drawn by the users, for the purpose of improving communication between the users. In a case in which the illustrations include text, the text is required to be displayed properly to the users.

It would be helpful to provide technology for properly displaying text to users.

A terminal apparatus according to an embodiment of the present disclosure includes a controller configured to flip text included in an illustration drawn by a first user on a virtual screen in virtual space to be legible as seen from a virtual camera.

An operating method of a terminal apparatus according to an embodiment of the present disclosure includes flipping text included in an illustration drawn by a first user on a virtual screen in virtual space to be legible as seen from a virtual camera.

A program according to an embodiment of the present disclosure is configured to cause a computer to execute an operation, the operation including flipping text included in an illustration drawn by a first user on a virtual screen in virtual space to be legible as seen from a virtual camera.

According to an embodiment of the present disclosure, technology for properly displaying text to users can be provided.

DETAILED DESCRIPTION

An embodiment of the present disclosure will be described below, with reference to the drawings.

Figure 1:
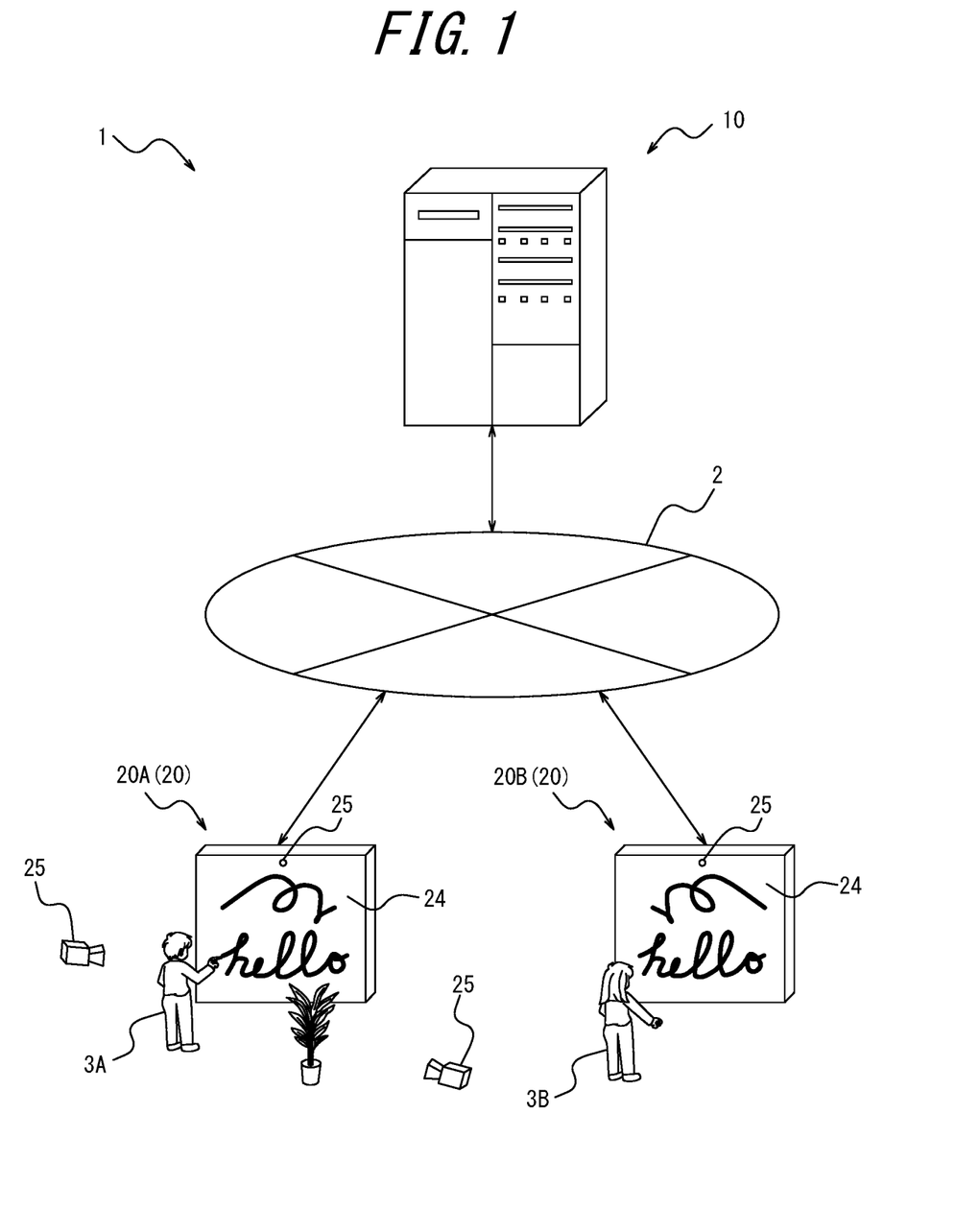
FIG. 1 is a diagram illustrating a schematic configuration of a provisioning system according to an embodiment of the present disclosure.

As illustrated in FIG. 1, a provisioning system 1 includes at least one server apparatus 10, a terminal apparatus 20A, and a terminal apparatus 20B.

Hereinafter, the terminal apparatuses 20A and 20B are also collectively referred to as "terminal apparatuses 20" unless particularly distinguished. The provisioning system 1 includes two terminal apparatuses 20. However, the provisioning system 1 may include three or more terminal apparatuses 20.

The server apparatus 10 can communicate with the terminal apparatuses 20 via a network 2. The network 2 may be any network including a mobile communication network, the Internet, or the like.

The provisioning system 1 is a system for providing virtual events. The virtual events are provided using virtual space. Users can participate in the virtual events as participants using the terminal apparatuses 20. In a virtual even according to the present embodiment, users can share illustrations. The virtual event according to the present embodiment may be performed in the field of play, creative activity, or the like.

The server apparatus 10 is, for example, a server computer that belongs to a cloud computing system or another computing system and functions as a server that implements various functions. The server apparatus 10 may be constituted of two or more server computers that are communicably connected to each other and operate in cooperation.

The server apparatus 10 performs processing required for provision of a virtual event. For example, the server apparatus 10 transmits information required for provision of the virtual event to the terminal apparatuses 20 via the network 2. The server apparatus 10 also intermediates transmission and reception of information between the terminal apparatuses 20A and 20B during the virtual event.

Each of the terminal apparatuses 20 is, for example, a terminal apparatus such as a desktop personal computer (PC), a tablet PC, a notebook PC, or a smartphone.

The terminal apparatus 20 is provided with a display 24 as a display apparatus. However, the terminal apparatus 20 may be provided with a display apparatus other than the display 24. For example, the terminal apparatus 20 may be provided with a projector as a display apparatus.

The display 24 is, for example, a liquid crystal display (LCD) or an organic electro luminescent (EL) display. The display 24 is configured as a touch panel display or a touch screen display, for example, together with a touch screen as an input interface 22 described below.

The terminal apparatus 20A is used by a first user 3A. The first user 3A participates in the virtual event using the terminal apparatus 20A.

The terminal apparatus 20B is used by a second user 3B. The second user 3B participates in the virtual event using the terminal apparatus 20B.

The first user 3A and the second user 3B can communicate with each other by sharing illustrations and the like in the virtual event.

For example, the first user 3A draws an illustration on the display 24 by touching the display 24 with a finger or a stylus pen. The terminal apparatus 20A transmits data on the illustration drawn by the first user 3A to the terminal apparatus 20B via the network 2 and the server apparatus 10. The terminal apparatus 20B receives, from the terminal apparatus 20A, the data on the illustration drawn by the first user 3A and controls the display 24 to display the illustration drawn by the first user 3A. The second user 3B can see the illustration drawn by the first user 3A on the display 24 of the terminal apparatus 20B. Here, the illustration drawn by the first user 3A includes text "hello". The terminal apparatus 20B flips the text "hello" included in the data on the illustration drawn by the first user 3A to be legible as seen from the second user 3B. This configuration allows the text to be properly displayed to the second user 3B.

(Configuration of Server Apparatus)

Figure 2:
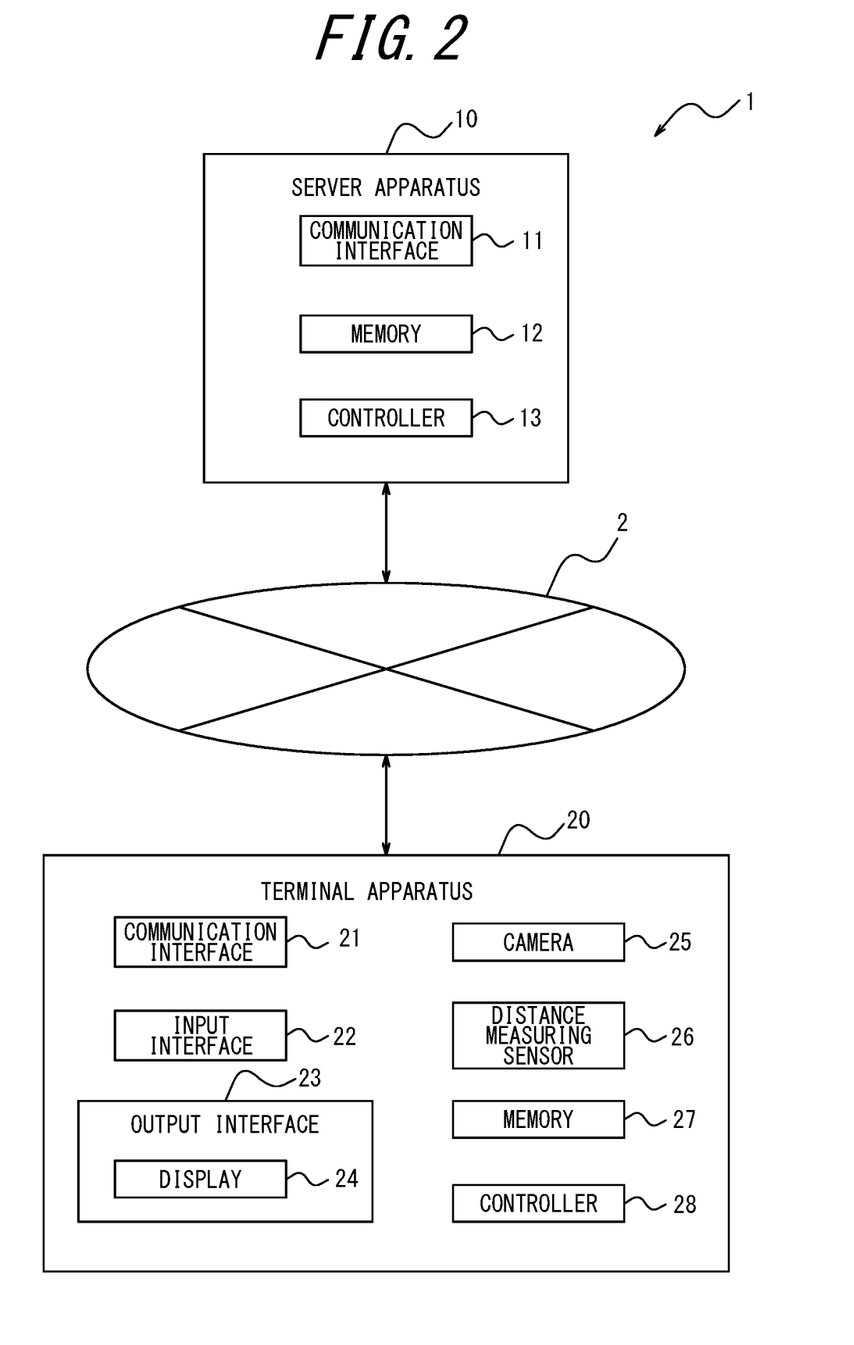
FIG. 2 is a block diagram of the provisioning system illustrated in FIG. 1.

As illustrated in FIG. 2, the server apparatus 10 includes a communication interface 11, a memory 12, and a controller 13.

The communication interface 11 is configured to include at least one communication module for connection to the network 2. For example, the communication module is a communication module compliant with a standard such as a wired Local Area Network (LAN) or a wireless LAN. However, the communication module is not limited to this. The communication module may be compliant with any communication standard. The communication interface 11 is connectable to the network 2 via a wired LAN or a wireless LAN using the communication module.

The memory 12 is configured to include at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM), dynamic random access memory (DRAM), or the like. The ROM is, for example, electrically erasable programmable read only memory (EEPROM) or the like. The memory 12 may function as a main memory, an auxiliary memory, a cache memory, or the like. The memory 12 stores data to be used for operations of the server apparatus 10 and data obtained by the operations of the server apparatus 10.

The controller 13 is configured to include at least one processor, at least one dedicated circuit, or a combination thereof. The processor is, for example, a general purpose processor such as a Central Processing Unit (CPU) or a Graphics Processing Unit (GPU), or a dedicated processor that is dedicated to specific processing. The dedicated circuit is, for example, a Field-Programmable Gate Array (FPGA), an Application Specific Integrated Circuit (ASIC), or the like. The controller 13 executes processing related to the operations of the server apparatus 10 while controlling the components of the server apparatus 10.

The functions of the server apparatus 10 may be implemented by executing a processing program according to the present embodiment by a processor corresponding to the controller 13. That is, the functions of the server apparatus 10 are realized by software. The processing program causes a computer to execute the operations of the server apparatus 10, thereby causing the computer to function as the server apparatus 10. That is, the computer executes the operations of the server apparatus 10 in accordance with the processing program to thereby function as the server apparatus 10.

Some or all of the functions of the server apparatus 10 may be implemented by a dedicated circuit corresponding to the controller 13. That is, some or all of the functions of the server apparatus 10 may be realized by hardware.

(Configuration of Terminal Apparatus)

As illustrated in FIG. 2, the terminal apparatus 20 includes a communication interface 21, an input interface 22, an output interface 23, a camera 25, a distance measuring sensor 26, a memory 27, and a controller 28. The terminal apparatus 20 may be provided with multiple cameras 25.

The communication interface 21 is configured to include at least one communication module for connection to the network 2. For example, the communication module is, for example, a communication module compliant with a standard such as a wired LAN standard or a wireless LAN standard, or a mobile communication standard such as the Long Term Evolution (LTE) standard, the 4th Generation (4G) standard, or the 5th Generation (5G) standard. However, the communication module is not limited to this. The communication module may be compliant with any communication standard.

The input interface 22 is capable of accepting an input from a user. The input interface 22 is configured to include at least one interface for input that is capable of accepting an input from a user. The interface for input includes a touch screen integrated with the display 24. In addition, the interface for input may include a physical key, a capacitive key, a pointing device, a microphone, or the like. However, the interface for input is not limited to this.

The output interface 23 is capable of outputting data. The output interface 23 is configured to include at least one interface for output that is capable of outputting data. The interface for output includes the display 24, a speaker, and the like. The interface for output may include multiple speakers installed around the display 24, for example. However, the interface for output is not limited to this.

The camera 25 is capable of imaging subjects to generate captured images. The camera 25 is, for example, a visible light camera. The camera 25 continuously images subjects at a frame rate of, for example, 15 to 30 [fps].

The camera 25 is positioned to allow imaging of a user facing the display 24, as a subject. The camera 25 may be positioned to allow imaging of the user's entire body. As an example, FIG. 1 illustrates the locations of multiple cameras 25 provided in the terminal apparatus 20A. For example, a part of the multiple cameras 25 provided in the terminal apparatus 20 are embedded in the front of the display 24. A camera 25 embedded in the front of the display 24 can capture a front image of a user. Another part of the multiple cameras 25 provided in the terminal apparatus 20 are positioned around the user to enable imaging of the user from multiple directions. However, the positioning of the cameras 25 is not limited to this. As another example, the camera 25 may be positioned in a location that allows a user to be imaged from obliquely above.

The distance measuring sensor 26 can measure a distance to a subject. The distance measuring sensor 26 is positioned to allow measurement of a distance from the display 24 to a subject. The distance measuring sensor 26 is positioned in a location that allows measurement of a distance to a user, as a subject. The distance measuring sensor 26 produces a distance image. The distance image is an image in which a pixel value of each pixel corresponds to a distance. The distance measuring sensor 26 includes, for example, a Time of Flight (ToF) camera, a Light Detection And Ranging (LiDAR), a stereo camera, or the like.

The memory 27 is configured to include at least one semiconductor memory, at least one magnetic memory, at least one optical memory, or a combination of at least two of these. The semiconductor memory is, for example, RAM, ROM, or the like. The RAM is, for example, SRAM, DRAM, or the like. The ROM is, for example, EEPROM or the like. The memory 27 may function as a main memory, an auxiliary memory, or a cache memory. The memory 27 stores data to be used for operations of the terminal apparatus 20 and data obtained by the operations of the terminal apparatus 20.

The controller 28 is configured to include at least one processor, at least one dedicated circuit, or a combination thereof. The processor is, for example, a general purpose processor such as a CPU or a GPU, or a dedicated processor that is dedicated to specific processing. The dedicated circuit is, for example, an FPGA, an ASIC, or the like. The controller 28 executes processing related to operations of the terminal apparatus 20 while controlling the components of the terminal apparatus 20.

The functions of the terminal apparatus 20 are realized by execution of a terminal program according to the present embodiment by a processor corresponding to the controller 28. That is, the functions of the terminal apparatus 20 are realized by software. The terminal program causes a computer to execute the operations of the terminal apparatus 20, thereby causing the computer to function as the terminal apparatus 20. That is, the computer executes the operations of the terminal apparatus 20 in accordance with the terminal program to thereby function as the terminal apparatus 20.

Some or all of the functions of the terminal apparatus 20 may be implemented by a dedicated circuit corresponding to the controller 28. That is, some or all of the functions of the terminal apparatus 20 may be realized by hardware.

(Operations of Provisioning System)

Figure 3:
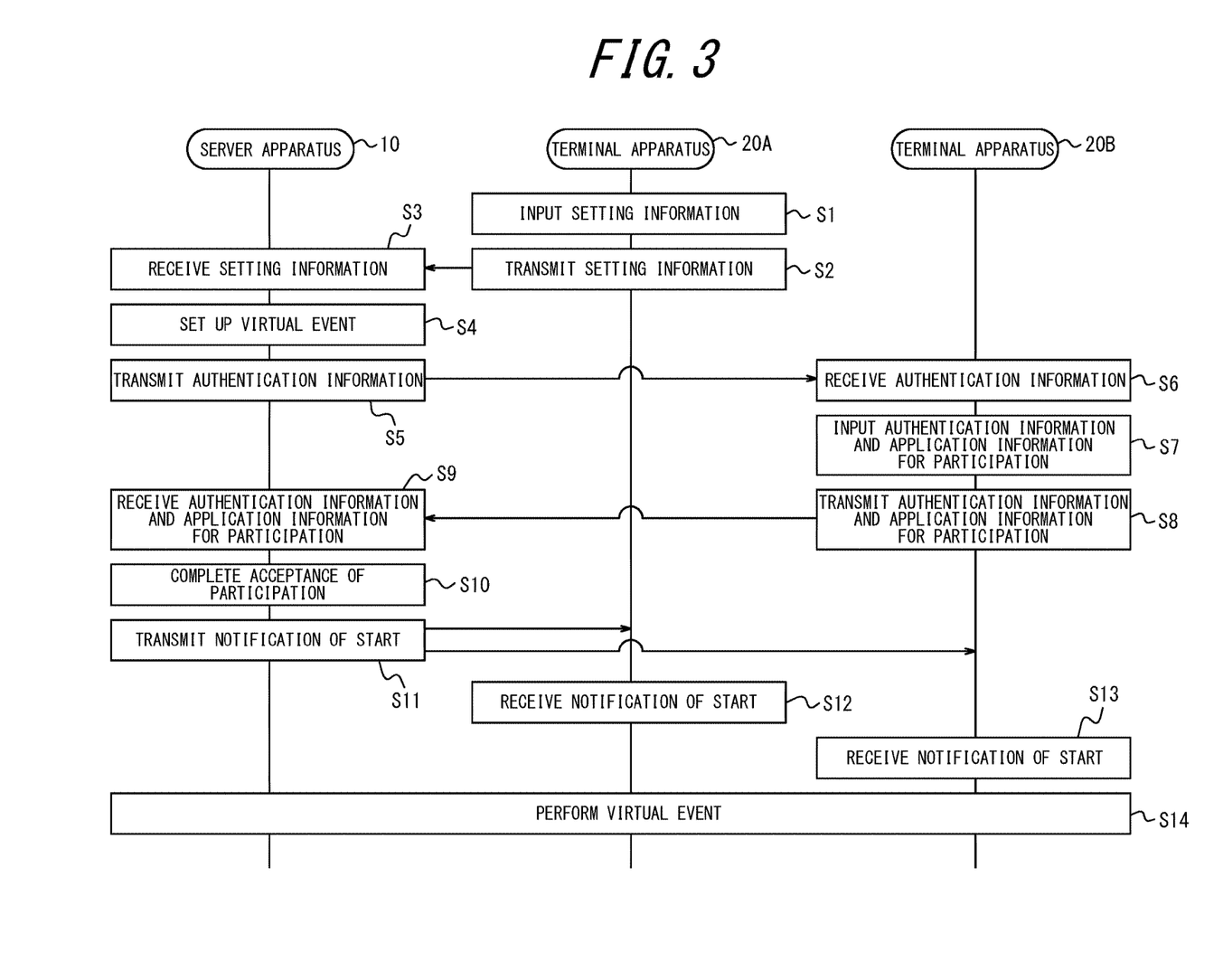
FIG. 3 is a sequence diagram illustrating an operation procedure of the provisioning system illustrated in FIG. 1.

FIG. 3 is a sequence diagram illustrating an operation procedure of the provisioning system 1 illustrated in FIG. 1. Hereinafter, assuming that the first user 3A sets up a virtual event as an administrator of the virtual event. It is also assumed that the first user 3A and the second user 3B participate in the virtual event as participants.

In the processing of step S1, in the terminal apparatus 20A, the controller 28 controls the input interface 22 to accept an input of setting information from the first user 3A. The setting information is information for setting up a virtual event. The setting information includes, for example, a schedule of the virtual event and a participant list. The participant list includes names and e-mail addresses of participants. Here, the participant list includes the name and e-mail address of the second user 3B, being a participant. For example, the controller 28 controls the communication interface 21 to access a site provided by the server apparatus 10 for setting up virtual events, and to acquire data for an input screen for entering setting information. The controller 28 controls the display 24 to display an input screen to present the input screen to the first user 3A. The first user 3A sees the input screen and enters the setting information from the input interface 22.

In the processing of step S2, in the terminal apparatus 20A, the controller 28 controls the communication interface 21 to transmit the setting information accepted by the input interface 22 to the server apparatus 10 via the network 2.

In the processing of step S3, in the server apparatus 10, the controller 13 controls the communication interface 11 to receive the setting information from the terminal apparatus 20A via the network 2.

In the processing of step S4, in the server apparatus 10, the controller 13 sets up a virtual event based on the setting information received in the processing of step S3. For example, the controller 13 generates authentication information. The authentication information is information for authenticating the second user 3B who is supposed to participate in the virtual event using the terminal apparatus 20B. The authentication information includes a participant ID, a passcode, and the like. The participant ID is identification information used by the second user 3B to participate in the virtual event as a participant.

In the processing of step S5, in the server apparatus 10, the controller 13 controls the communication interface 11 to transmit the generated authentication information to the terminal apparatus 20B via the network 2. The controller 13 transmits the authentication information to the terminal apparatus 20B by attaching the authentication information to an e-mail.

In the processing of step S6, in the terminal apparatus 20B, the controller 28 controls the communication interface 21 to receive the authentication information from the server apparatus 10 via the network 2. The controller 28 receives the authentication information attached to the e-mail.

In the processing of step S7, in the terminal apparatus 20B, the controller 28 controls the input interface 22 to accept an input of the authentication information and application information for participation from the second user 3B. For example, the controller 28 controls the communication interface 21 to access the site for setting up virtual events provided by the server apparatus 10, and to acquire data for an input screen for entering authentication information and application information for participation. The controller 28 controls the display 24 to display an input screen to present the input screen to the second user 3B. The second user 3B sees the input screen and enters, from the input interface 22, the authentication information attached to the e-mail and the application information for participation.

In the processing of step S8, in the terminal apparatus 20B, the controller 28 controls the communication interface 21 to transmit the authentication information and the application information for participation accepted by the input interface 22 to the server apparatus 10 via the network 2.

In the processing of step S9, in the server apparatus 10, the controller 13 controls the communication interface 11 to receive the authentication information and the application information for participation from the terminal apparatus 20B via the network 2. The controller 13 completes an acceptance of participation of the second user 3B by receiving the authentication information and the application information for participation (step S10).

In the processing of step S11, in the server apparatus 10, the controller 13 controls the communication interface 11 to transmit a notification of a start of the event to each of the terminal apparatuses 20A and 20B via the network 2.

In the processing of step S12, in the terminal apparatus 20A, the controller 28 controls the communication interface 21 to receive the notification of the start of the event from the server apparatus 10 via the network 2. Upon receiving the notification of the start of the event, the controller 28 may start capturing images of the first user 3A.

In the processing of step S13, in the terminal apparatus 20B, the controller 28 controls the communication interface 21 to receive the notification of the start of the event from the server apparatus 10 via the network 2. Upon receiving the notification of the start of the event, the controller 28 may start capturing images of the second user 3B.

In the processing of step S14, the terminal apparatus 20A and the terminal apparatus 20B perform the virtual event via the server apparatus 10.

(Operations of Terminal Apparatus)

Figure 4:
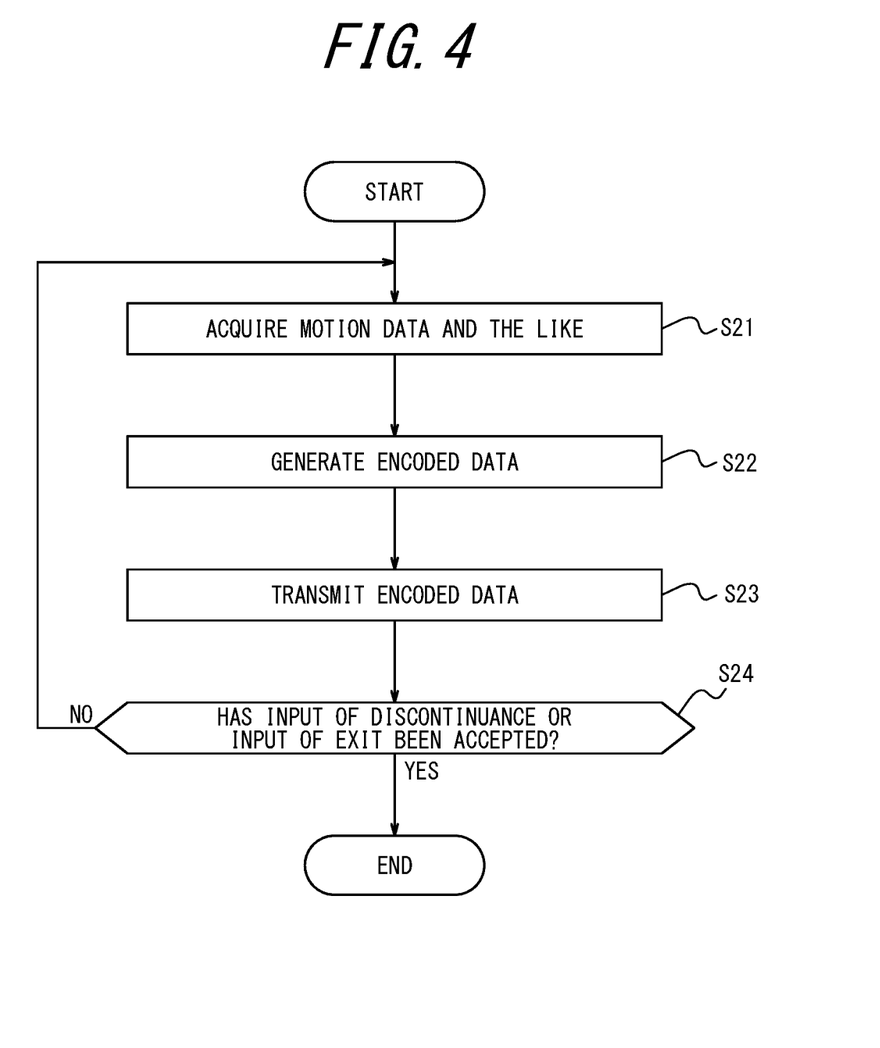
FIG. 4 is a flowchart illustrating an operation procedure of a terminal apparatus illustrated in FIG. 2.

FIG. 4 is a flowchart illustrating an operation procedure of the terminal apparatuses 20 illustrated in FIG. 2. The operation procedure illustrated in FIG. 4 is common to the terminal apparatuses 20A and 20B. The operation procedure illustrated in FIG. 4 is an example of an operating method of the terminal apparatuses 20 according to the present embodiment. The operation procedure illustrated in FIG. 4 is performed in the processing of step S14 illustrated in FIG. 3. In the following description, it is assumed that the terminal apparatus 20A performs the operation procedure illustrated in FIG. 4.

In the processing of step S21, the controller 28 acquires motion data on the first user 3A. In the present embodiment, the controller 28 acquires data on a distance image of the first user 3A, as the motion data on the first user 3A, by the distance measuring sensor 26. The distance from the display 24 to the first user 3A varies with movement of the first user 3A. Therefore, the data on the distance image of the first user 3A can be used as the motion data on the first user 3A.

In the processing of step S21, the controller 28 acquires, using the cameras 25, data on captured images of the first user 3A.

In the processing of step S21, the controller 28 acquires data on an illustration drawn by the first user 3A on the display 24, in response to a touch operation on a touch screen of the input interface 22.

In the processing of step S21, the controller 28 acquires sound data by collecting speech and other sound produced by the first user 3A with a microphone of the input interface 22.

Here, in the processing of step S21, the controller 28 acquires, at the same timing, the motion data on the first user 3A, the data on the captured images of the first user 3A, the data on the illustration drawn by the first user 3A, and the sound data on the first user 3A. In other words, the data on the captured images of the first user 3A, the data of the illustration drawn by the first user 3A, and the sound data on the first user 3A are synchronized to the motion data on the first user 3A.

In the processing of step S22, the controller 28 generates encoded data by encoding the data acquired in the processing of step S21. In encoding, the controller 28 may perform any processing (for example, resolution change, cropping, or the like) on the data on the captured images or the like.

In the processing of step S23, the controller 28 controls the communication interface 21 to transmit the encoded data, as packets, to the server apparatus 10 via the network 2. The encoded data is transmitted to the terminal apparatus 20B via the server apparatus 10.

In the processing of step S24, the controller 28 determines whether the input interface 22 has accepted an input to discontinue imaging and the like or an input to exit from the virtual event. When it is determined that the input to discontinue imaging and the like or the input to exit from the virtual event has been accepted (step S24: YES), the controller 28 ends the operation procedure as illustrated in FIG. 4. When it is not determined that the input to discontinue imaging and the like or the input to exit from the virtual event has been accepted (step S24: NO), the controller 28 returns to the processing of step S21.

Figure 5:
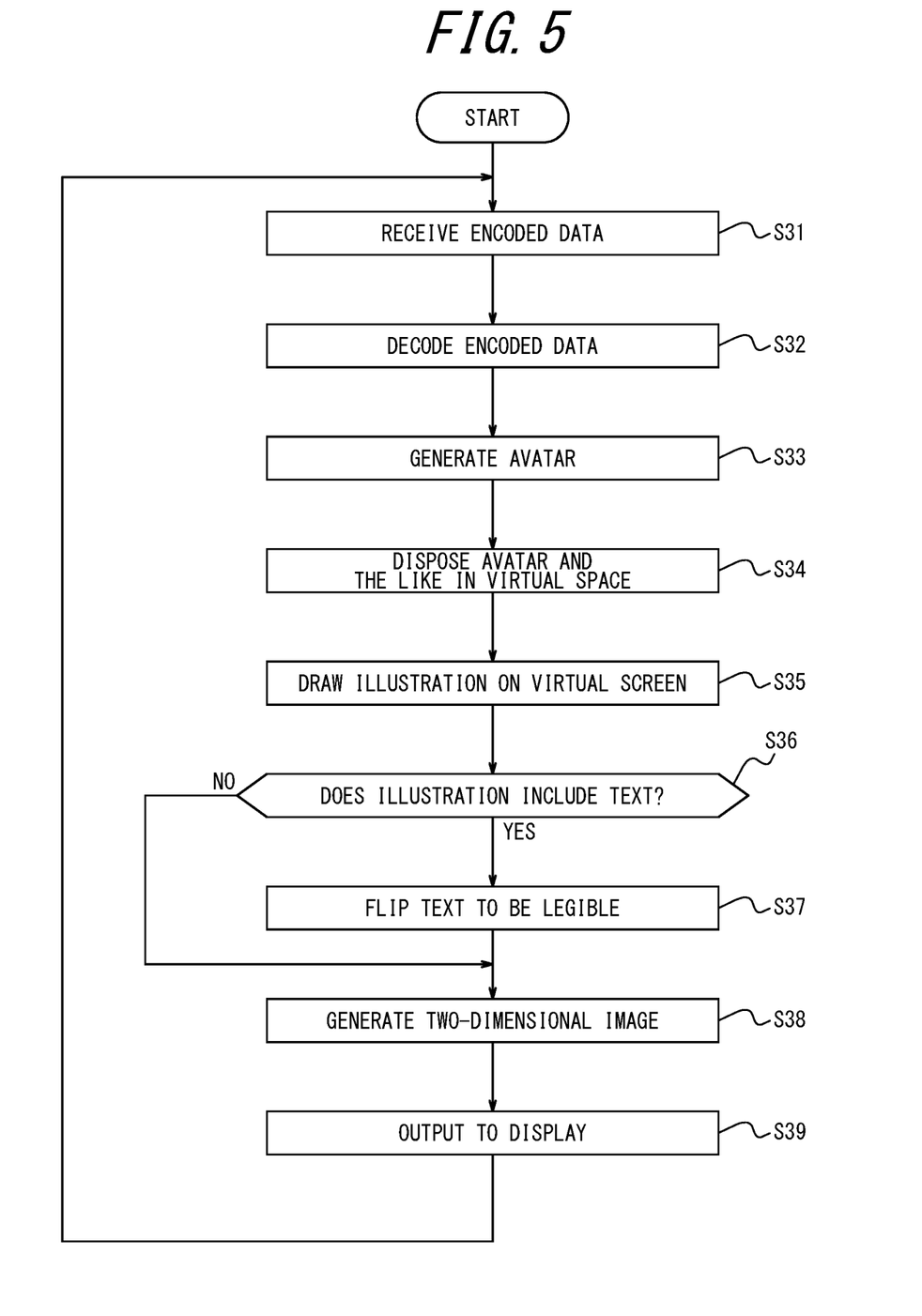
FIG. 5 is a flowchart illustrating an operation procedure of the terminal apparatus illustrated in FIG. 2.

FIG. 5 is a flowchart illustrating an operation procedure of the terminal apparatuses 20 illustrated in FIG. 2. The operation procedure illustrated in FIG. 5 is common to the terminal apparatuses 20A and 20B. The operation procedure illustrated in FIG. 5 is an example of an operating method of the terminal apparatuses 20 according to the present embodiment. The operation procedure illustrated in FIG. 5 is performed in the processing of step S14 illustrated in FIG. 3. In the following description, it is assumed that the terminal apparatus 20B performs the operation procedure illustrated in FIG. 5.

In the processing of step S31, the controller 28 controls the communication interface 21 to receive encoded data from the terminal apparatus 20A via the network 2 and the server apparatus 10.

In the processing of step S32, the controller 28 decodes the received encoded data. The controller 28 decodes the encoded data to acquire motion data on the first user 3A, data on captured images of the first user 3A, data on an illustration drawn by the first user 3A, and sound data on the first user 3A. The data on the captured images of the first user 3A, the data on the illustration drawn by the first user 3A, and the sound data on the first user 3A are synchronized with the motion data on the first user 3A by the processing in step S21 described above.

Figure 6:
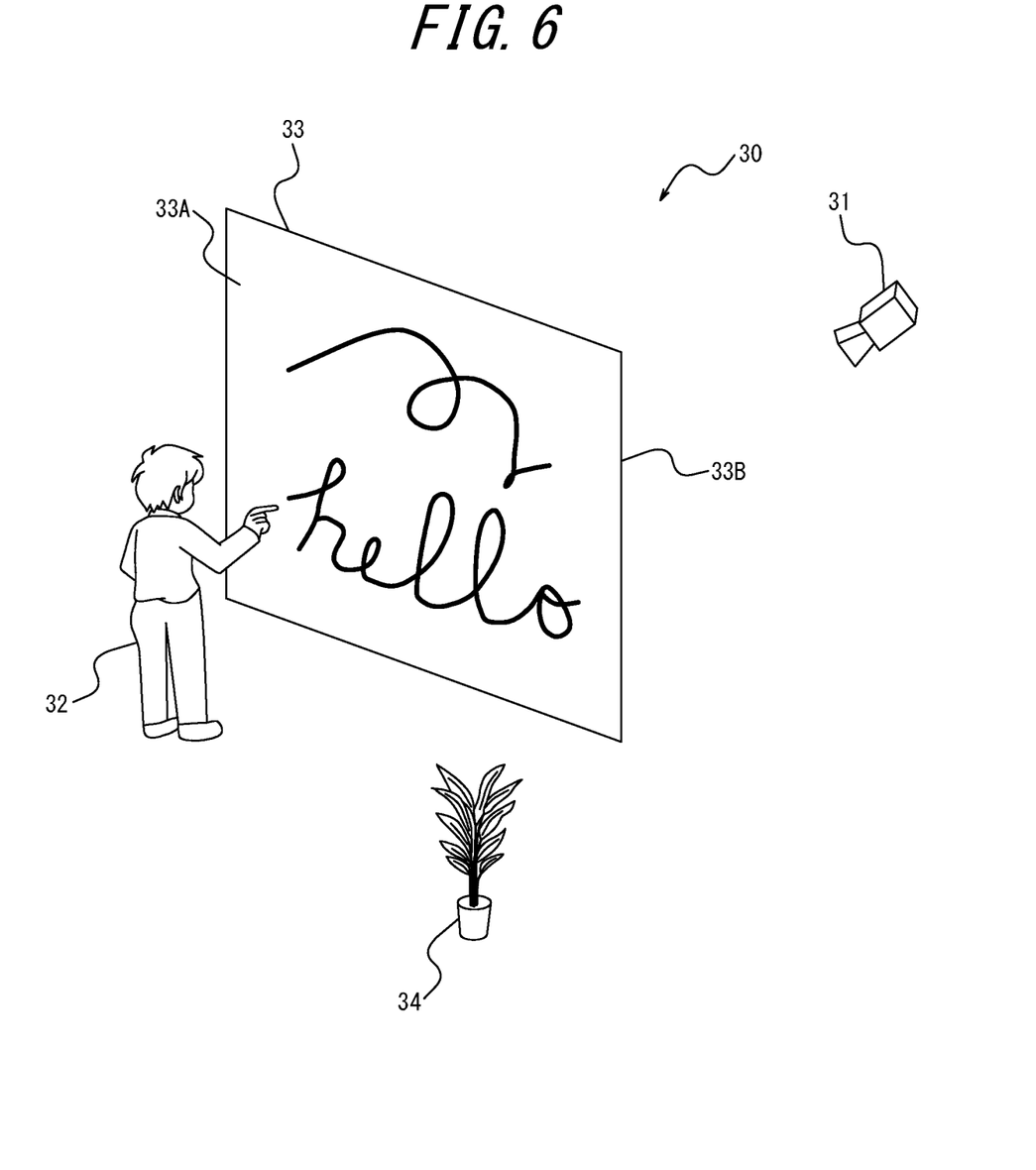
FIG. 6 is a drawing for explaining virtual space.

In the processing of step S33, the controller 28 generates an avatar 32 of the first user 3A, as illustrated in FIG. 6, using the data acquired in the processing of step S32. For example, the controller 28 generates a polygon model using the motion data on the first user 3A, i.e., data on a distance image of the first user 3A. Furthermore, the controller 28 generates the appearance of the avatar 32 from the data on the captured images of the first user 3A by applying texture mapping to the polygon model using the data on the captured images of the first user 3A. However, the controller 28 may employ any method to generate the avatar 32 of the first user 3A.

Here, in the processing of step S33, the controller 28 may generate the front appearance of the avatar 32 from data on a captured front image of the first user 3A, which is included in the data on the captured images of the first user 3A acquired in the processing of step S32. The captured front image of the first user 3A is captured, for example, by the camera 25 embedded in the front of the display 24 of the terminal apparatus 20A. In a case in which the data on the captured images acquired in the processing of step S32 does not include data on a captured front image of the first user 3A, the controller 28 may generate the front appearance of the avatar 32 from data on other captured images of the first user 3A. For example, the controller 28 generates the front appearance of the avatar 32 by interpolation, correction, or the like of data on captured images generated by imaging the first user 3A from multiple directions, which is included in the data on the captured images acquired in the processing of step S32. Alternatively, the controller 28 may generate the front appearance of the avatar 32 by duplicating data on previously captured front images of the first user 3A.

In the processing of step S34, the controller 28 disposes a virtual camera 31, the avatar 32, and a virtual screen 33 in virtual space 30, as illustrated in FIG. 6. The controller 28 disposes the virtual screen 33 between the virtual camera 31 and the avatar 32. The virtual screen 33 includes a surface 33A on the side of the avatar 32 and a surface 33B on the side of the virtual camera 31. The surface 33A corresponds to a screen of the display 24 of the terminal apparatus 20A. The surface 33B corresponds to a screen of the display 24 of the terminal apparatus 20B.

In the processing of step S34, the controller 28 may dispose the avatar 32 in the virtual space 30 as if the avatar 32 were drawing an illustration on the virtual screen 33. For example, when the first user 3A draws an illustration by touching the display 24 with a finger or a stylus pen, the avatar 32 is disposed in the virtual space 30 such that a finger or a stylus pen of the avatar 32 touches the surface 33A of the virtual screen 33.

In the processing of step S34, the controller 28 may determine or adjust the position, orientation, and field of view of the virtual camera 31, based on a line of sight of the second user 3B facing the display 24 of the terminal apparatus 20B as illustrated in FIG. 1. For example, the controller 28 determines the position of the virtual camera 31 based on the height of the line of sight of the second user 3B. The controller 28 also determines the orientation of the virtual camera 31 based on the direction of the line of sight of the second user 3B. The controller 28 may detect data on the line of sight of the second user 3B by analyzing data on captured images of the second user 3B captured by the camera 25 of the terminal apparatus 20B. However, the controller 28 may determine or adjust the position, orientation, and field of view of the virtual camera 31 based on an operation input by the second user 2B accepted by the input interface 22.

In the processing of step S35, the controller 28 draws the illustration drawn by the first user 3A on the virtual screen 33, as illustrated in FIG. 6, based on the data on the illustration drawn by the first user 3A acquired in the processing of step S32. For example, the controller 28 draws the illustration on the surface 33A of the virtual screen 33.

In the processing of step S36, the controller 28 determines whether the illustration drawn on the virtual screen 33 includes text, for example, by any method such as machine learning. When the controller 28 determines that the illustration drawn on the virtual screen 33 includes text (step S36: YES), the operation proceeds to the processing of step S37. In the configuration illustrated in FIG. 6, the controller 28 determines that the illustration includes text "hello". On the other hand, when the controller 28 determines that the illustration drawn on the virtual screen 33 does not include text (step S36: NO), the operation proceeds to the processing of step S38.

In the processing of step S37, the controller 28 flips the text on the virtual screen 33 to be legible as seen from the virtual camera 31. As an example, the controller 28 may identify the direction of reading the text on the virtual screen 33 as seen by the avatar 32, using any method such as machine learning. In addition, the controller 28 may flip the text on the virtual screen 33 so that the text on the virtual screen 33 can be read as seen from the virtual camera 31 in the identified direction of reading the text. In the configuration illustrated in FIG. 6, the controller 28 identifies the direction of reading the text "hello" on the virtual screen 33 as the direction from left to right as seen from the avatar 32. The controller 28 flips the text "hello" on the virtual screen 33 so that the text "hello" can be read in the direction from left to right as seen from the virtual camera 31. As another example, the controller 28 can identify the direction of reading text on the virtual screen 33 as seen from the avatar 32, as the direction from top to bottom. In this case, the controller 28 flips the left and right sides of the text on the virtual screen 33 so that the text can be read as seen from the virtual camera 31. The controller 28 may set an axis at the center of the text to be flipped and flip the text with respect to the set axis.

In the processing of step S37, the controller 28 may flip the text included in the illustration drawn on the virtual screen 33 on a word-by-word or sentence-by-sentence basis to be legible as seen from the virtual camera 31. For example, when the controller 28 determines that the text included in the illustration drawn on the virtual screen 33 constitutes a word but not a sentence, the controller 28 flips the text on a word-by-word basis to be legible as seen from the virtual camera 31. When the controller 28 determines that the text included in the illustration drawn on the virtual screen 33 constitutes a sentence, the controller 28 flips the text on a sentence-by-sentence basis to be legible as seen from the virtual camera 31. When the controller 28 determines that the text included in the illustration drawn on the virtual screen 33 does not constitute any word and sentence, the controller 28 may flip the text to be legible as seen from the virtual camera 31. The controller 28 may use any method, such as machine learning, to determine whether the text on the virtual screen 33 constitutes a word or sentence, or the like. By automatically flipping the text on the virtual screen 33 on a word-by-word or sentence-by-sentence basis, the second user 3B can easily read the text. This improves convenience of the second user 3B.

In the processing of step S38, the controller 28 generates, by rendering, a two-dimensional image of the virtual space 30 projected on the virtual screen 33 as seen from the virtual camera 31, as illustrated in FIG. 6.

In the processing of step S39, the controller 28 controls the display 24 to display the two-dimensional image generated in step S38. The controller 28 controls a speaker of the output interface 23 to output sound acquired in the processing of step S32. The controller 28 may appropriately select a speaker to output sound, from among multiple speakers of the output interface 23. For example, the avatar 32 is drawn in the two-dimensional image to be displayed on the display 24. The controller 28 selects a speaker near the drawn avatar 32, as a speaker to output sound, from among the multiple speakers provided around the display 24, so that the sound is output from near the drawn avatar 32.

After performing the processing of step S39, the controller 28 returns to the processing of step S31. The controller 28 repeats steps S31 to S39 until, for example, encoded data is no longer transmitted from the terminal apparatus 20A or the virtual event is terminated.

In the second and subsequent processing of steps S34 and S35, the controller 28 moves the avatar 32, as illustrated in FIG. 6, based on motion data on the first user 3A and data on an illustration drawn by the first user 3A synchronized with the motion data. The controller 28 draws the illustration on the virtual screen 33 while moving the avatar 32 as if the avatar 32 were drawing the illustration drawn by the first user 3A on the virtual screen 33. The controller 28 may draw the illustration on the virtual screen 33 while moving the avatar 32 in real time, as if the avatar 32 were drawing the illustration drawn by the first user 3A on the virtual screen 33. By moving the avatar 32 in real time, the first user 3A and the second user 3B can communicate in real time.

Thus, in the processing of step S39, the two-dimensional image of the virtual space 30, as illustrated in FIG. 6, is displayed on the display 24 of the terminal apparatus 20B. According to this configuration, it appears to the second user 3B as if the first user 3A were drawing the illustration on the display 24 of the terminal apparatus 20B while facing the second user 3B through the display 24 of the terminal apparatus 20B. Therefore, the second user 3B can feel like looking at a figure of the first user 3A drawing the illustration and the illustration itself through glass. Thus, the first user 3A and the second user 3B can share the illustration and a figure drawing the illustration.

In addition, the appearance of the avatar 32 is generated from the data on the captured images of the first user 3A in the processing of step S33, the second user 3B can feel as if the first user 3A himself/herself were drawing the illustration. This configuration can improve communication between users.

In the processing of step S37, the text included in the illustration drawn on the virtual screen 33 is flipped to be legible as seen from the virtual camera 31. With this configuration, when the two-dimensional image of the virtual space 30 is displayed on the display 24 of the terminal apparatus 20B, the text is legible from the second user 3B. Thus, convenience of the second user 3B can be improved. Therefore, technology for properly displaying text to users can be provided.

Hereinafter, variations of the present embodiment will be described.

In the processing of step S33 described above, the controller 28 may generate the appearance of the avatar 32 from data on images of a character. In this case, the controller 28 generates the appearance of the avatar 32 from data on images of a character by applying texture mapping using the data on the images of the character to the polygon model. Generating the appearance of the avatar 32 from the data on the images of the character can enhance playability. This improves communication between users.

In the processing of step S34 described above, the controller 28 may dispose a virtual object 34, as illustrated in FIG. 6, instead of the avatar 32, in the virtual space 30. In this case, the controller 28 disposes the virtual screen 33 between the virtual camera 31 and the virtual object 34. The controller 28 may generate the virtual object 34 from an object in the captured images of the first user 3A. Alternatively, the controller 28 may use a preset object as the virtual object 34. Even with the use of the virtual object 34 instead of the avatar 32, the second user 3B can still perceive depth in the two-dimensional image of the virtual space 30 displayed on the display 24 of the terminal apparatus 20B. Perceiving the depth in the two-dimensional image on the display 24 allows the second user 3B to feel like looking at the illustration drawn by the first user 3A on the display 24 through glass.

In the processing of step S37 described above, the controller 28 may flip the text included in the illustration drawn on the virtual screen 33 to be legible as seen from the virtual camera 31, based on an operation input by the second user 3B accepted by the input interface 22. As an example, the controller 28 may accept a touch operation by the second user 3B on a text portion on the display 24 by means of a touch screen of the input interface 22, which is integrated with the display 24. Upon accepting the touch operation, the controller 28 may flip the text included in the illustration drawn on the virtual screen 33 to be legible as seen from the virtual camera 31. This configuration allows the second user 3B to flip the text on the display 24 at desired timing.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, in the embodiment described above, the display apparatus is assumed to be a display. However, the display apparatus is not limited to a display. As another example, the display apparatus may be a projector. In a case in which the display apparatus is a projector, the controller 28 may acquire both motion data on the first user 3A and data on an illustration drawn by the first user 3A with the distance measuring sensor 26. Since the first user 3A moves while drawing an illustration, data on the illustration drawn by the first user 3A can be estimated and acquired from motion data on the first user 3A.

For example, the controller 28 of the terminal apparatus 20 does not have to perform the processing of steps S36 and S37 as illustrated in FIG. 5. In this case, for example, in the processing of steps S34 and S35, which is performed repeatedly, the controller 28 of the terminal apparatus 20B may move the avatar 32 based on the motion data on the first user 3A. The controller 28 may draw the illustration drawn by the first user 3A on the virtual screen 33 while moving the avatar 32 as if the avatar 32 were drawing the illustration drawn by the first user 3A on the virtual screen 33. With this configuration, as described above, the second user 3B can feel like looking at a figure of the first user 3A drawing the illustration and the illustration itself through glass. Thus, the first user 3A and the second user 3B can share the illustration and the figure drawing the illustration.

For example, in the embodiment described above, the terminal apparatus 20A and the terminal apparatus 20B are described as performing the virtual event via the server apparatus 10. However, the terminal apparatus 20A and the terminal apparatus 20B may perform the virtual event without through the server apparatus 10. As an example, the terminal apparatus 20A and the terminal apparatus 20B may perform the virtual event while being connected in a Peer to Peer (P2P) architecture.

For example, an embodiment in which a general purpose computer functions as the terminal apparatus 20 according to the above embodiment can also be implemented. Specifically, a program in which processes for realizing the functions of the terminal apparatus 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. A terminal apparatus comprising:
a controller configured to: generate a two-dimensional image of a virtual space projected on a virtual screen as seen from a virtual camera; control a display apparatus to display the generated two-dimensional image;
determine whether an illustration drawn by a first user on the virtual screen in the virtual space includes text; and
when it is determined that the illustration includes text, flip the text to be legible as seen from the virtual camera, and when it is determined that the illustration includes no text, perform no flipping.

2. The terminal apparatus according to claim 1, wherein the controller is configured to flip the text included in the illustration on a word-by-word or sentence-by-sentence basis to be legible as seen from the virtual camera.

3. The terminal apparatus according to claim 1, further comprising an input interface,
wherein the controller is configured to flip the text included in the illustration to be legible as seen from the virtual camera, based on an operation input by a second user accepted by the input interface.

4. The terminal apparatus according to claim 1, further comprising a communication interface, wherein the controller is configured to:
control the communication interface to receive motion data on the first user and data on the illustration synchronized with the motion data; and
draw the illustration on the virtual screen while moving an avatar of the first user based on the received motion data as if the avatar of the first user were drawing, on the virtual screen, the illustration drawn by the first user.

5. The terminal apparatus according to claim 4, wherein the controller is configured to dispose the virtual screen, in the virtual space, between the virtual camera and the avatar or between the virtual camera and a virtual object.

6. The terminal apparatus according to claim 4, wherein the controller is configured to:
control the communication interface to receive data on a captured image of the first user; and
generate an appearance of the avatar from the data on the captured image of the first user.

7. The terminal apparatus according to claim 4, wherein the controller is configured to generate an appearance of the avatar from data on an image of a character.

8. The terminal apparatus according to claim 4, wherein the controller is configured to draw the illustration on the virtual screen in real time, while moving the avatar as if the avatar were drawing the illustration on the virtual screen.

9. The terminal apparatus according to claim 1, wherein the display apparatus is a display,
motion data on the first user is acquired by a distance measuring sensor, and
data on the illustration drawn by the first user is acquired in response to a touch operation on a touch screen of another display.

10. The terminal apparatus according to claim 1, wherein the controller is configured to determine an orientation of the virtual camera based on a line of sight of a second user facing the display apparatus.

11. An operating method of a terminal apparatus, the operating method comprising:
generating a twodimensional image of a virtual space projected on a virtual screen as seen from a virtual camera; and controlling a display apparatus to display the generated two-dimensional image determining whether an illustration drawn by a first user on the virtual screen in the virtual space includes text; and
when it is determined that the illustration includes text, flipping the text to be legible as seen from the virtual camera, and when it is determined that the illustration includes no text, performing no flipping.

12. The operating method of a terminal apparatus according to claim 11, further comprising flipping the text included in the illustration on a word-by-word or sentence-by-sentence basis to be legible as seen from the virtual camera.

13. The operating method of a terminal apparatus according to claim 11, further comprising flipping the text included in the illustration to be legible as seen from the virtual camera, based on an operation input by a second user accepted by an input interface.

14. The operating method of a terminal apparatus according to claim 11, further comprising:
controlling a communication interface to receive motion data on the first user and data on the illustration synchronized with the motion data; and
drawing the illustration on the virtual screen while moving an avatar of the first user based on the received motion data as if the avatar of the first user were drawing, on the virtual screen, the illustration drawn by the first user.

15. The operating method of a terminal apparatus according to claim 14, further comprising disposing the virtual screen, in the virtual space, between the virtual camera and the avatar or between the virtual camera and a virtual object.

16. The operating method of a terminal apparatus according to claim 14, further comprising:
controlling the communication interface to receive data on a captured image of the first user; and
generating an appearance of the avatar from the data on the captured image of the first user.

17. The operating method of a terminal apparatus according to claim 14, further comprising generating an appearance of the avatar from data on an image of a character.

18. The operating method of a terminal apparatus according to claim 14, further comprising drawing the illustration on the virtual screen in real time, while moving the avatar as if the avatar were drawing the illustration on the virtual screen.

19. A non-transitory computer readable medium storing a program configured to cause a computer to execute an operation, the operation comprising: generating a two-dimensional image of a virtual space projected on a virtual screen as seen from a virtual camera; and
controlling a display apparatus to display the generated two-dimensional image determining whether an illustration drawn by a first user on the virtual screen in the virtual space includes text; and
when it is determined that the illustration includes text, flipping the text to be legible as seen from the virtual camera, and when it is determined that the illustration includes no text, performing no flipping.

* * * * *